United States Patent
Huang et al.

(10) Patent No.: US 6,483,485 B1
(45) Date of Patent: Nov. 19, 2002

(54) METHOD AND DEVICE FOR PROTECTING EYES THROUGH SCREEN DISPLAYING SETTING

(75) Inventors: Jung-Tang Huang, 5F, No. 7, Lane 10, Sec. 2, Ba-De Rd., Taipei City (TW); Jau-Wei He, Feng-Shan (TW)

(73) Assignee: Jung-Tang Huang, Taipei City (TW)

( * ) Notice: Subject to any disclaimer, the term of this patent is extended or adjusted under 35 U.S.C. 154(b) by 0 days.

(21) Appl. No.: 09/550,172

(22) Filed: Apr. 14, 2000

(30) Foreign Application Priority Data

Aug. 18, 1999 (TW) .......................................... 088114142

(51) Int. Cl.[7] .................................................. G09G 1/06
(52) U.S. Cl. .......................................... 345/10; 348/68
(58) Field of Search ..................... 345/10, 11; 348/73, 348/78, 50, 207, 68

(56) References Cited

U.S. PATENT DOCUMENTS 4,845,554 A * 7/1989 Kimura et al. ................. 348/69
5,953,053 A * 9/1999 Chen et al. ..................... 348/20
2002/0021281 A1 * 2/2002 Asami ........................ 345/156

* cited by examiner

*Primary Examiner*—Richard Hjerpe
*Assistant Examiner*—Ronald Laneau
(74) *Attorney, Agent, or Firm*—Dennison, Schultz & Dougherty

(57) ABSTRACT

A system formed by a device on the CCD or CMOS above a terminal display and a display screen setting program is disclosed. This system will set the working environment of a VDT user to an optimum value. The images of the VDT user and the peripheral environment are captured. Then the working environment of the VDT user, the illumination of the environment of the VDT user, the fatigue of the VDT user, and the distance between the VDT user and a display are determined. The brightness, contrast, colors and clearness of the font of the terminal display are adjusted and controlled automatically according to the illumination of the environment of the VDT user and the fatigue of the VDT user. When the illumination of the environment of the VDT user, the fatigue of the VDT user, and the distance between the VDT user and a display has been over a predetermined condition, an alarm will emit to inform the user. The fatigue and tightness of eyes of a VDT user is reduced effectively so that the eyes of user are well protected.

4 Claims, 7 Drawing Sheets

METHOD AND DEVICE FOR PROTECTING EYES THROUGH SCREEN DISPLAYING SETTING

FIELD OF THE INVENTION

The present invention relates to a method and device for protecting eyes through screen displaying setting comprising a CCD or a CMOS camera above a terminal display and a system formed by display screen setting programs. The screen can be adjusted automatically, and the working environment of a VDT (visual display terminal) user can be optimized. The fatigue and tightness of eyes of a VDT user is reduced effectively so that the eyes of the user are well protected.

BACKGROUND OF THE INVENTION

Currently, there are many people who are working in the field of computer. According to the research of Wang, Chin Thier (1996, the research about the occupational injuries of computer workers), a worker who uses a VDT has an average of 6.8 hours to work with a computer. The related injuries have the asthenopia, and the musculoskeletal disorder. These dramatically affect the health of the worker. According to the research of Wong, Lin Chung (1994, research about the Ophthalmic VDT syndrome, about the visual acuity, refraction, intraocular pressure and accommodative function), as the VDT user views the terminals for a long time, visual fatigue is the major complaint of VDT syndrome, following by dry eye, itching and blurred vision. The eyes will be afraid of light and the number of blinking is increased. If the illumination of working environment of a VDT user, the brightness, contrast or colors of the display can be improved so that the characters of the display are clear and a proper visual distance can be retained, the fatigue of a VDT user can be reduced effectively and the tightness of the muscles of eyes can be released. Thus, the eyes are protected.

The working environment of the VDT user is set by the VDT user from the subjective point of view. Therefore, as the VDT user views the display for a long time, the eyes of VDT user will be hurt potentially.

SUMMARY OF THE INVENTION

Accordingly, the primary object of the present invention is to provide a method for protecting eyes through the screen displaying setting, wherein every time period, a CCD or CMOS camera captures images of a VDT user and the environment. Accordingly, the illumination of the environment of the VDT user, the fatigue of the VDT user, and the distance between the VDT user and a display are determined.

Another object of the present invention is to provide a device for protecting eyes through the screen displaying setting comprising a CCD or a CMOS camera above a terminal display and a system formed by display screen setting programs.

Therefore, the screen can be adjusted automatically, and the working environment of a VDT user can be optimized. The fatigue and tightness of eyes of a VDT user is reduced effectively so that the eyes of user are well protected.

The various objects and advantages of the present invention will be more readily understood from the following detailed description when read in conjunction with the appended drawing.

DETAILED DESCRIPTION OF THE PREFERRED EMBODIMENTS

Figure 1:
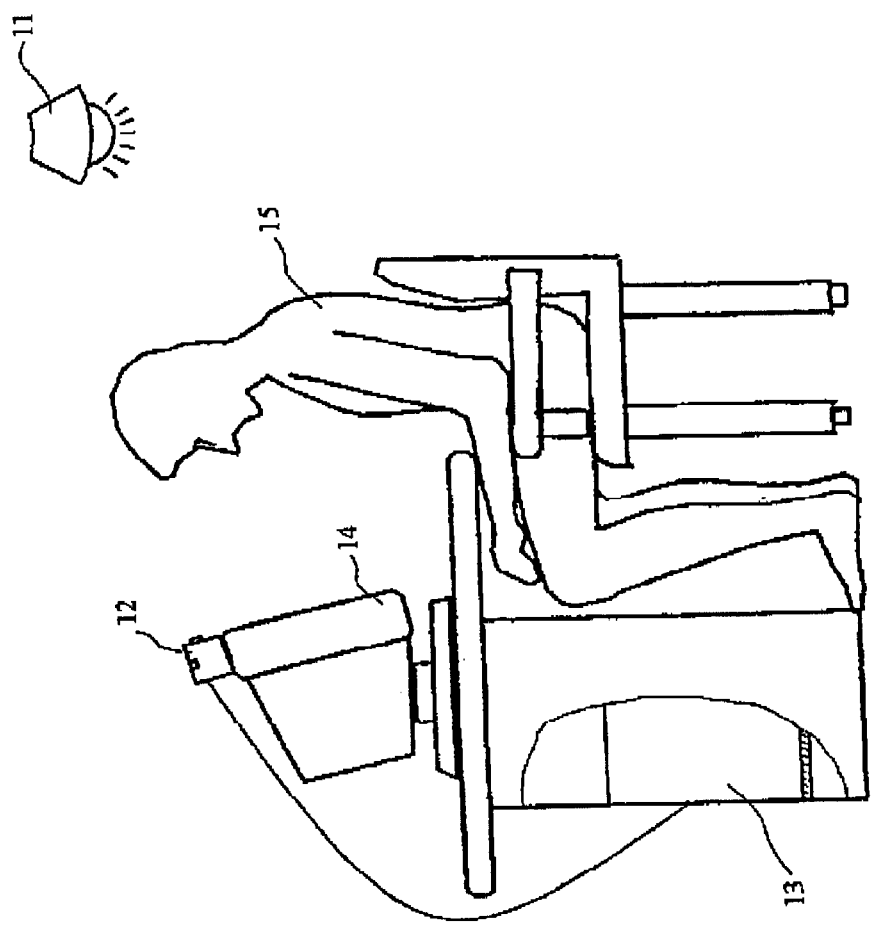
FIG. 1 shows an embodiment of the present invention.

With reference to FIG. 1, the embodiment of the present invention is illustrated. The lamp 11 provides an illumination. The hardware device is primarily a CCD or CMOS camera 12 (in the following, it is called as camera), computer mainframe 13 and a display. The VDT user 15 locates in front of a screen. The difference of the present invention and a computer is that in the present invention, a digital image camera or a pupil camera can be used. The pupil camera uses a general monochrome camera, for example, a monochrome CCD camera with a lens of 60 mm or other assembly. The difference in the camera of the present invention from the prior art is that the method for detecting the fatigue of eye.

Figure 2:
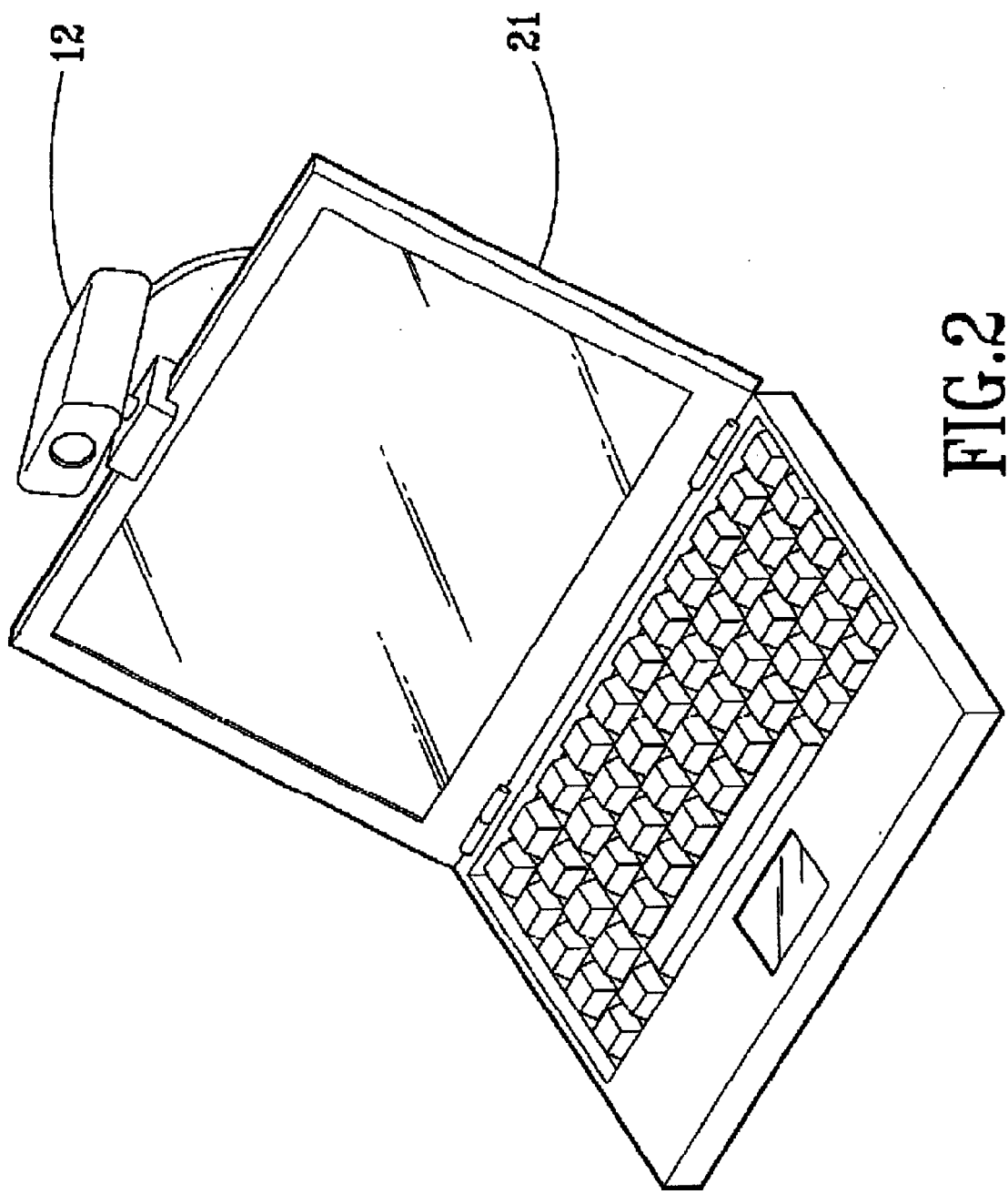
FIG. 2 shows another embodiment of the present invention.

With reference to FIG. 2, the second embodiment of the present invention is illustrated. In this embodiment, the camera can be used as an attachment, and is attached to a notebook computer.

Figure 3:
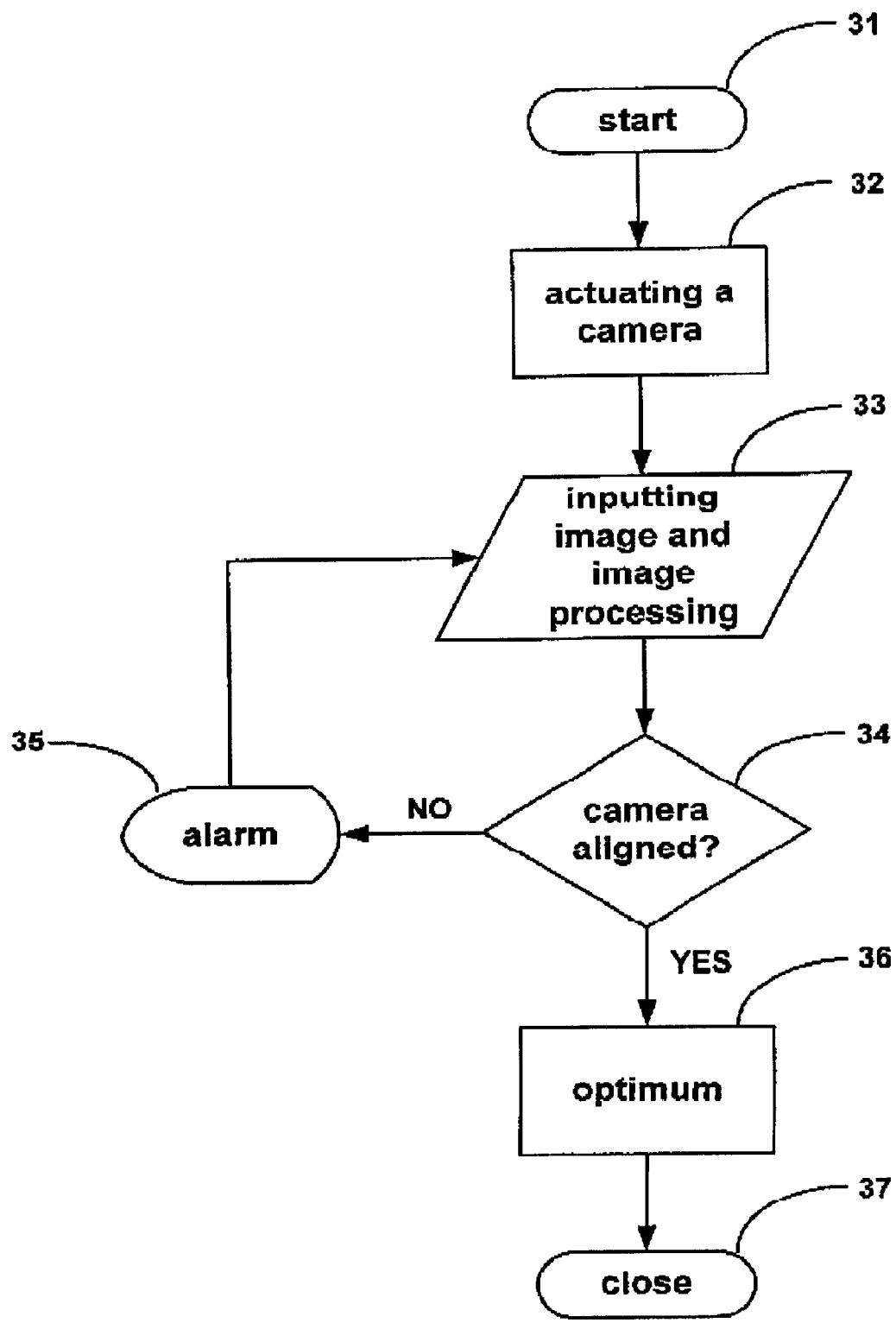
FIG. 3 shows the flow diagram of the display screen setting program according to the present invention.

Referring to FIG. 3, after the display screen setting program of the present invention is loaded into the Window operating system, it will be registered in the operating system. After the computer is started up each time, window will automatically perform the step 31 to activate the display screen setting program of the present invention.

After the display screen setting program of the present invention is performed, in step 32, the program of the present invention will activate the camera 12.

In step 33, by the camera 12, the images of the VDT user 15 and the peripheral working environment are captured so as to judge the outlook of the VDT user 15.

In step 34, the feature of the outlook form step 33 is used to judge the user. If the features of the outlook of the VDT user can not be captured, step 35 is performed for emitting an alignment alarm 61, referring to FIG. 6. This will inform the VDT user 15 to determine whether the VDT user 15 has aligned, which is allowed with an error of ±10 cm under the condition that the eye of the VDT user 15 has a distance of 60 cm with the camera. These processes are performed repeatedly until the image of the VDT user 15 is captured. Then, step 36 is performed.

Figure 4:
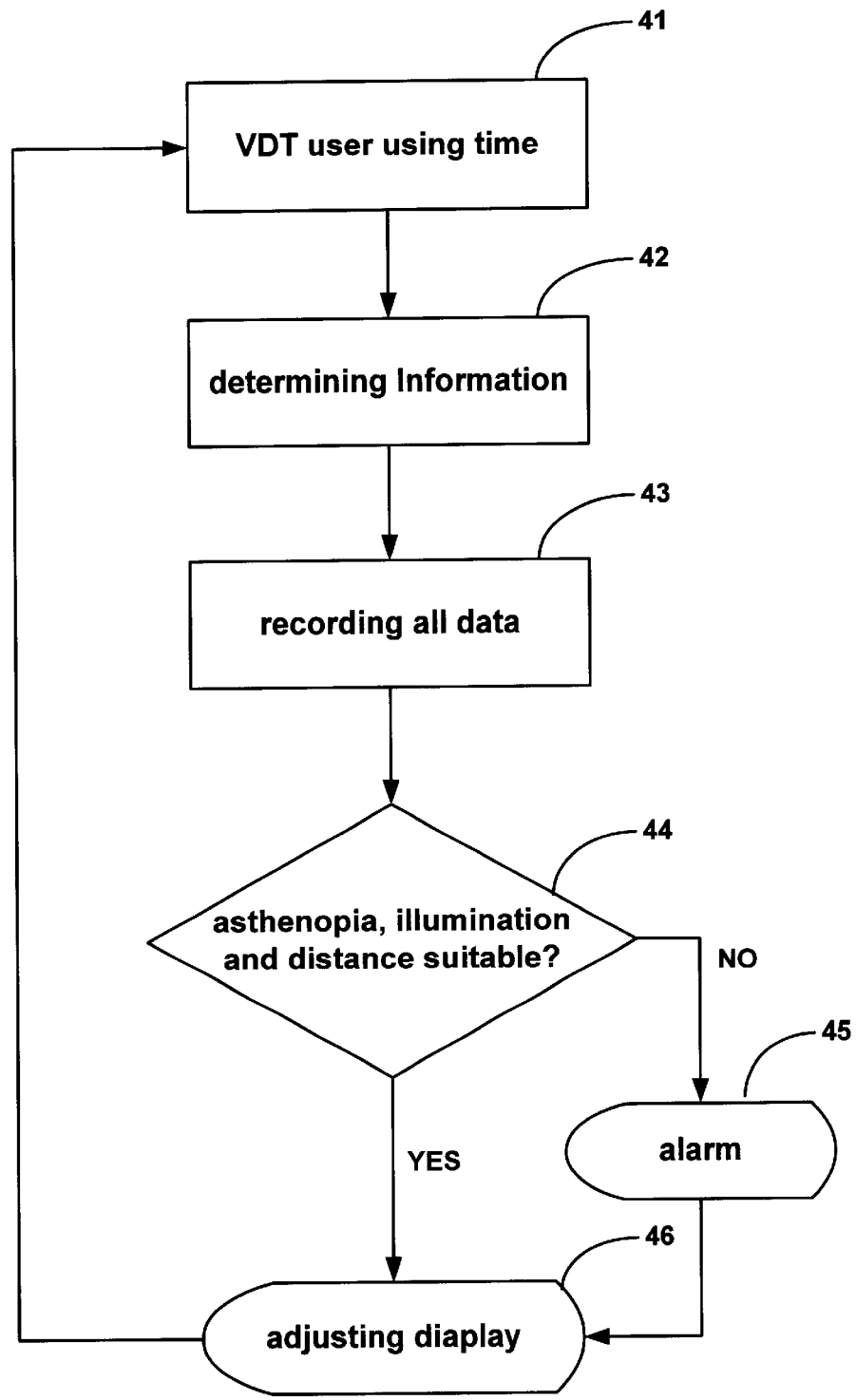
FIG. 4 is a flow diagram of an prefferred decision of the present invention.

In step 36, an optimum determination is performed. Referring to FIG. 4, in step 41, the program of the present invention will count the using time of the VDT user.

In step 42, using the image captured by step 33, the illumination of the working environment of the VDT user and the distance between VDT user's eye and the display 14 can be calculated. If the device is a digital image camera, then the blinking frequency of the VDT user can be determined. If the device is a pupil camera, then the size of the pupil can be measured.

In step 43, all data is recorded, such as blinking frequency or the size of the pupil, or the illumination of the environment, or the use time of the VDT user 15, the fatigue extent of the VDT user's eye and the distance between the VDT user's eye and the display 14. Moreover, the brightness, contrast and colors of the display in the operating system are captured.

In step 44, the recording value recording in step 43 is used to determine the fatigue of the user's eye, environment illumination, and visual distance. If the device is a digital image camera, in every ten minutes, the blinking times of the VDT user 15 in one minute is calculated. The optimum blinking times is 12~15 per minute. If the blinking time is over 15 per minute, it represents that the eyes are fatigue gradually. If the number is less than 12 per minute, it represents that the eyes are dry. Further, by the operating time of the VDT user 15, the fatigue of eyes can be determined. If the device is a pupil camera, then per five minutes, the sizes of the pupils of the VDT user are measured. According to that described in the Lowenstein & Lorwenfeld (1963, Pupillary movements during acute and chronic fatigue), the diameter of the pupil varies with the alert of people and fatigue of eyes. Based upon the measurable and sensitive property of the pupils, the diameter of the pupil is an indicator for measuring the fatigue of the eyes. Under a normal illumination circumstance and after a long enough rest, the pupil has a largest diameter. With the increase of fatigue, the diameter of the pupil becomes smaller. Before sleeping, the pupil has a smallest size. By the variation of the size of the pupil and the operation time of the VDT user, the fatigue of the VDT user 15 can be determined. If the fatigue of the VDT user 15 over a predetermined value or the operation time is too long, then in step 45, an eye fatigue alarm 72 is emitted. By this alarm, the VDT user 17 may set whether the computer is necessary to be closed.

Figure 6:
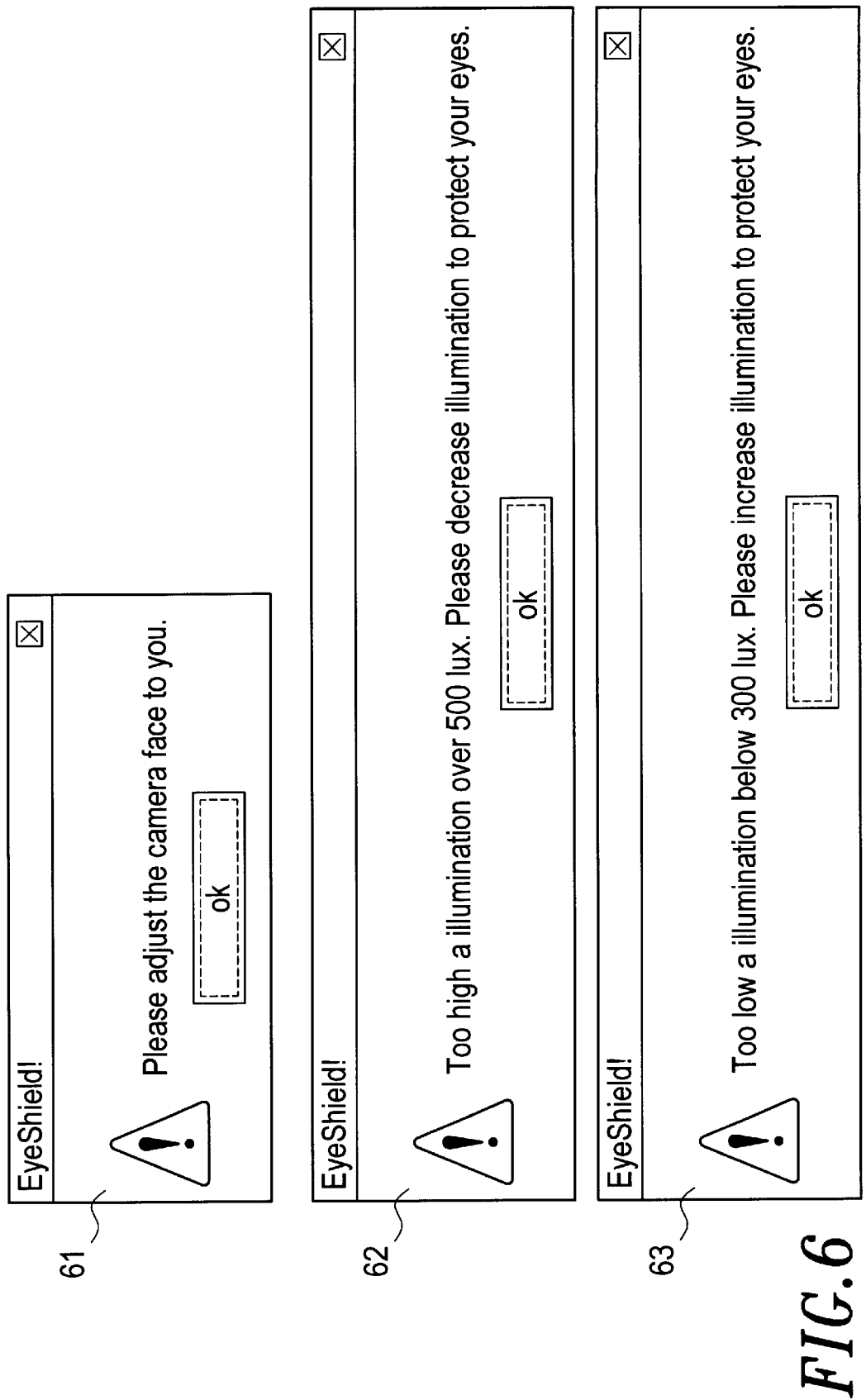
FIG. 6 is an alerting window for setting the screen of a display in the present invention.

The illumination of the operation environment of the VDT user from step 42 is compared with the data in the data base. An ideal illumination is between 300~500 lux, if the illumination is too high, a flash light is emitted from the document so that the eyes feel discomfort as they moves between the screen and the document. To adjust the luminance will induce the illumination of the screen and environment is not over 1:10 for helping the eye to suit the environment. If the illumination in the environment of the VDT user is improper, step 45 is performed. In this step, a first illumination alarm 62 or a second illumination alarm 63 is emitted. With reference to FIG. 6, a VDT user himself (herself) may determine whether it is needed to shut down the computer in force.

Figure 7:
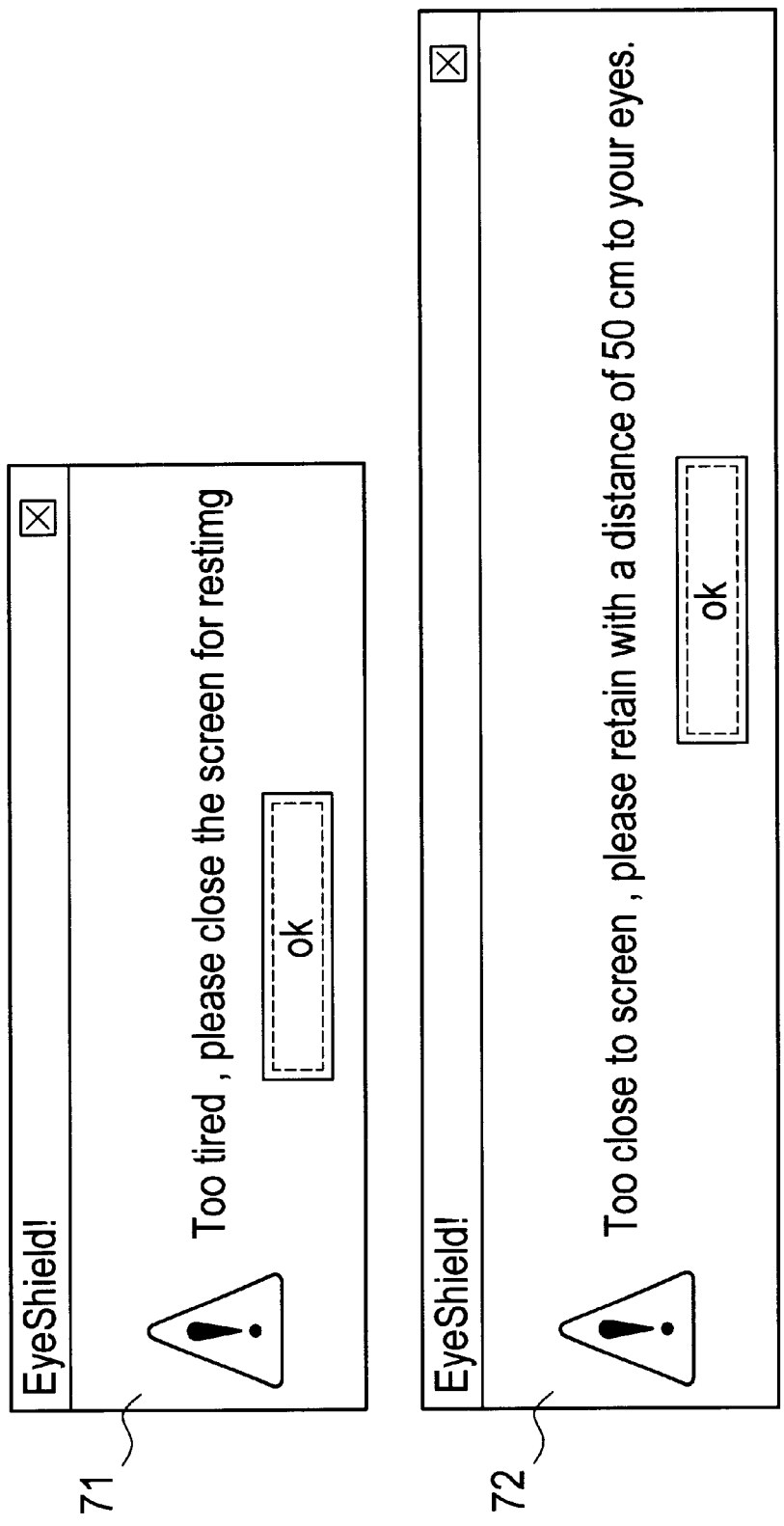
FIG. 7 is another alerting window for setting the screen of a display in the present invention.

The visual distance of the VDT user determined from step 42 is the distance between the VDT user 15 and the eyes of the VDT user, this data is compared with the data in the database. From the Swedish ISO proposal, it indicates that a proper vision distance between the VDT user and the display 14 is ±60 cm. To retain a proper vision distance is helpful to the protection of eye. If the vision distance of the VDT user is less than 50 cm, then step 45 is performed, a vision distance alarm 71 is emitted, referring to FIG. 7. The detecting method of an over vision distance is to use the outlook captured in step 33, the area of the outlook is calculated and then is compared with a normal value in a normal vision distance. Since the area of the outlook is proportional to the vision distance, the current vision distance of the VDT user 15 can be estimated for judging whether the vision distance is a proper value.

In step 46, from the illumination of the environment of the VDT user in step 42, according to the illumination displayed in the display captured in step 43, contrast and color, and fatigue of the eyes of VDT user 15, the output of the screen is adjusted. According to the description of the Snyder (1988, Handbook of Human-computer Interaction), the contrast ratio is at least 3:1, then the characters displayed on the screen can be clearly identified. The contrast ratio is defined as CR=Lmax/Lmin. Further, according to the suggestion of Zhu and Wu (1990, On the standardization of VDT proper and optimal contrast range), as the brightness of a screen is 20 $cd/m^2$, the preferred contrast ratio is 11:1. When the brightness of a screen is 30 $cd/m^2$, the contrast ratio is 9:1, and when the brightness of screen is 40 $cd/m^2$, the contrast ratio is 7:1. That is to say, when the brightness of the screen is lower, the contrast ratio must be enlarged. According to the description of Chai, Guan Chen (1995, the effects of the contrast of color and the operation property to the visual effect and visual fatigue), in a long period operation, in order to have a high visual effect, the contrast ratio of a screen is set as 7:1. In summary, the brightness and the contrast ratio required to be adjusted to cause the ratio of laminance modulation of the screen and environment of the screen not over 1:10 so that font is clear and can be identified easily. And in the principle of high visual effect, after a set operation time, adjusting work must be performed. The brightness and the contrast of brightness of the display 14 can be calculated and the background and color the system window can be varied so that cells of the eyes stimulated by colors can be changed, and thus the fatigue of eyes of a VDT user 15 is reduced.

In step 37, the screen setting program of the display of the present invention can be implemented continuously and the eyes of VDT user 15 can be protected continuously until the operating system is over.

Figure 5:
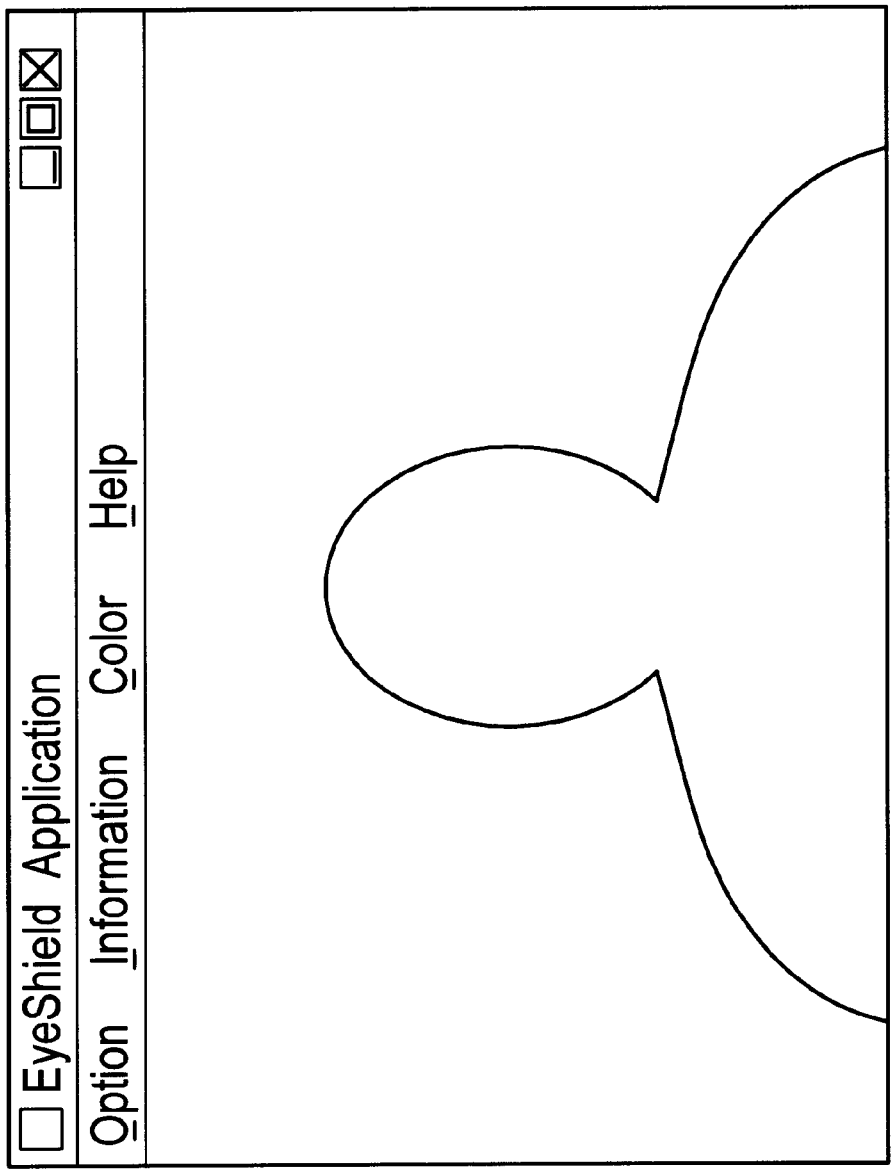
FIG. 5 is a window for setting the screen of a display in the present invention.

Referring to FIG. 5, the window for the display screen setting program is illustrated. In the system operation gate of the Windows operating system, the double click represents to call the display screen setting program of the present invention. The window of the display screen setting program is displayed on the center of the screen. The main menu 51 has Option, Information, Colors, and Help. The main functions in the Option item are that at least two camera can be used, cameras is installed, in which the VDT user 15 can change captured images, and the window display can be ended. The main functions in the Information item are that parameters for setting displaying screen, the set of enforcing shutting down, and the dialog box displayed on the screen. The main function of the Color item is to display the color parameters of the current system window and background. The VDT user 15 can change the display order of color or close the function of changing color. The main function of the Help item is to display program information, edition and copyright of program. The status 52 will list the driving program name of the camera and system time. While the checking window 53 will display the image captured by the camera 12.

In summary, the present invention provides a device and a system for automatically setting the working environment of the VDT user to a preferred condition. The fatigue and tightness of the muscles of eyes of the VDT user can be released by the present invention. Therefore, the user's eyes are protected.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for protecting eyes through screen displaying setting, wherein every time period, a CCD or CMOS camera captures images of a VDT user and the working environment of the VDT user, then the illumination of the environment of the VDT user, the fatigue of the VDT user, and the distance between the VDT user and a display are determined;

the brightness, contrast, colors and clearness of the font of the terminal display are adjusted and controlled automatically according to the illumination of the environment of the VDT user and the fatigue of the VDT user;

when the illumination of the environment of the VDT user, the fatigue of the VDT user, and the distance between the VDT user and a display has been over a predetermined condition, an alarm will emit to inform the user.

2. The method as claimed in claim 1, wherein the use time of the VDT user with the blinking frequency of eyes and the sizes of the pupil of VDT user serve to decide the fatigue state; if the system has a digital image camera, then blinking frequency is used; if the system has a pupil camera, then the size of the pupil is used.

3. The method as claimed in claim 1, wherein the brightness, contrast, colors and clearness of the font of the terminal display are varied according to the fatigue of eyes.

4. The method as claimed in claim 1, wherein the system emits an alarm to the user to improve the states, the way for alarming includes to display characters in a dialog box, emits alarming voice, etc.; furthermore, the VDT user can set a condition of shutting off in force.

* * * * *